United States Patent [19]
Chen

[11] Patent Number: 5,649,233
[45] Date of Patent: Jul. 15, 1997

[54] APPARATUS FOR FLEXIBLY SELECTING PRIMARY AND SECONDARY CONNECTORS AND MASTER AND SLAVE CASCADED DISK DRIVES OF AN IDE INTERFACE

[75] Inventor: Zhi-Hsien Chen, Hsinchu Hsien, Taiwan

[73] Assignee: United Microelectronics Corporation, Hsinchu, Taiwan

[21] Appl. No.: 516,742

[22] Filed: Aug. 18, 1995

[51] Int. Cl.$^6$ .............................. G06F 13/40; G06F 13/42
[52] U.S. Cl. .................... 395/800; 395/822; 395/828; 395/309; 395/500; 364/DIG. 1; 364/DIG. 2
[58] Field of Search ................................. 395/892, 829, 395/600, 180, 800, 182.2, 309, 183.14, 185.01, 822, 478, 849, 182.4, 500, 872; 364/DIG. 1, DIG. 2, 514 R; 361/686, 687, 683, 726, 727; 371/37.4, 37.7, 40.1

[56] References Cited

U.S. PATENT DOCUMENTS

| | | | |
|---|---|---|---|
| 5,278,730 | 1/1994 | Kikinis | 361/686 |
| 5,412,666 | 5/1995 | Squires et al. | 371/37.4 |
| 5,446,877 | 8/1995 | Liu et al. | 395/180 |
| 5,483,419 | 1/1996 | Kaczeus, Sr. et al. | 361/685 |
| 5,488,572 | 1/1996 | Belmont | 364/514 R |
| 5,511,227 | 4/1996 | Jones | 395/829 |

*Primary Examiner*—Daniel H. Pan
*Attorney, Agent, or Firm*—Cushman Darby & Cushman IP Group of Pillsbury Madison & Sutro, LLP

[57] ABSTRACT

An apparatus for selecting the primary/secondary and the master/slave configuration of an enhanced IDE interface. The apparatus has a first and a second connector, each for connecting to a cascade of a first and a second IDE drive device. The apparatus comprises a primary/secondary configuration logic and a master/slave configuration logic. The primary/secondary configuration logic is utilized for selectively configuring the first and second connectors of the enhanced IDE interface as the primary and secondary connectors of the IDE interface respectively, or as the secondary and primary connectors of the enhanced IDE interface respectively. The master/slave configuration logic is utilized for selectively configuring the first and second IDE drive devices in each of the cascades as the master and slave drives respectively, or as the slave and master drives respectively.

13 Claims, 2 Drawing Sheets

APPARATUS FOR FLEXIBLY SELECTING PRIMARY AND SECONDARY CONNECTORS AND MASTER AND SLAVE CASCADED DISK DRIVES OF AN IDE INTERFACE

BACKGROUND OF THE INVENTION

1. Field of the Invention

The present invention relates in general to a disk drive controller for computer systems. In particular, the present invention provides a disk drive controller that is capable of arbitrary drive letter assignment, and furthermore, is capable of arbitrary drive letter assignment without the need for physical jumper settings and/or disk drive data/control cable re-connection.

2. Description of Related Art

The IDE (integrated disk electronics) interface has been widely adopted for small computer systems as the standard interface for disk storage subsystems. For example, the IDE interface is found in many 80X86-based IBM-compatible computer systems. One primary reason that IDE hard disk drives are popular is because they are relatively easy to integrate into a computer system, because the disk control electronics are all built onto the drive itself. The interface to the computer system appears to be a simple set of I/O windows, or, I/O ports to the system expansion bus, or more precisely, to the CPU of the system. Accessing an IDE disk drive is a matter of the CPU issuing I/O read/writes to the designated I/O ports of its I/O space, and the disk electronics handling the substantial storage and retrieval of data bits on the disk drive.

Because the disk controller electronic circuitry is built into the drive, it can be tailored to achieve optimal compatibility with the specific electrical and mechanical characteristics of the disk drive into which it is integrated. Any disk drive compatibility problems are hidden from the user by the IDE interface. This is the primary reason why the IDE drives have replaced the MFM (modified frequency-modulation) drives as the low cost and cost-effective disk storage for home and office computer systems.

The IDE interface was originally designed as a hard disk drive interface that could handle only two physical drives. One or two IDE drive units may be present on each IDE disk controller. When two drives are installed, they are cascaded on a common data/control cable, with one assigned as the master, and the other as the slave drive. Either of the two installed drives can be configured as the master or the slave drive via the setting of one or more switches, or more commonly Berg jumpers, on the electronic printed circuit board of the drives.

However, the IDE interface, as such is now found to be inadequate for the desired number of supported drive units. The capacity of the standard IDE interface to support only two drive units is becoming insufficient to support the increasing number of devices that are designed to use an IDE interface to a computer system. For example, some removable disk storage systems have provided IDE versions in addition to SCSI counterparts. CD-ROM drive units are also migrating to the IDE arena. It is therefore common to find a computer system that already has two IDE hard disk drives installed with no additional room for a CD-ROM drive featuring the IDE interface.

To overcome this problem of insufficient device support capability, an improved version of the IDE interface, known as the Enhanced IDE (EIDE) interface was introduced. The EIDE interface has two sets of device connectors, a primary set and a secondary set, each of which, like its IDE counterpart, supports a master and slave, two devices in cascade. Thus, for a computer system equipped with an EIDE interface, four IDE disk and/or CD-ROM drives can be connected to the primary and secondary connectors as drives C, D, E and F respectively.

Normally, the master drive of the primary connector is drive C, the slave drive of the primary connector is drive D, the master drive of the secondary connector is drive E, and the slave drive of the secondary connector is drive F. As was in the case of the IDE interface, the physical drive letters arrangement, or the assignment of the master and slave drives on either the primary or secondary connector, are determined by the setting of drive configuration jumpers.

FIG. 1 (Prior Art) of the accompanying drawing of the present invention is a block diagram showing the configuration of a conventional connection of four IDE hard disk drives over an EIDE interface in a computer system. As is seen in the drawing, the disk controller 20, which may be implemented in a disk controller IC chip in the typical EIDE interface adapter for microprocessor-based home or office computers, can be hooked up to the computer system through I/O port 10 via a system expansion bus, not shown in the drawing. The disk controller 20 has connected thereto the primary and secondary connectors 30 and 40 respectively for the EIDE interface. The primary and secondary connectors 30 and 40 may each connect a cascade of two IDE disk devices, such as the IDE drives 50 and 51 in the primary cascade and the IDE drives 60 and 61 in the secondary cascade.

Normally, the IDE drives 50 and 51 in the primary cascade are each assigned as the master and slave drives via the setting of the jumper blocks 55 and 56 contained therein respectively, and the IDE drives 60 and 61 in the secondary cascade are each assigned as the master and slave drives via the setting of the jumper blocks 65 and 66 contained therein respectively. Drive 50 and 51 on the primary cascade are assigned the drive letters C and D respectively, while drives 60 and 61 on the secondary cascade are assigned the letters E and F respectively.

As described above, the IDE drives appear to the host computer system as simple I/O devices over the designated I/O ports. All the interfacing commands issued to the drives by the host computer, as well as the data transceiving between the drives and the host, are done via these designated I/O ports. In the case of the ISA version of the EIDE interface, the data transfer between the host and the drives are conducted over the ISA bus in single or double-bytes. For example, in the original IBM PC-AT computer, the I/O ports 1F0h–1F7h (hexadecimal) were designated for the "fixed disk drive". In ISA computers systems generally known as IBM-compatible computer, drives C and D of the primary cascade have a set of designated I/O ports at address 1F0h–1F7h (generally denoted as 1FXh), while drives E and F of the secondary cascade have a set of I/O ports designated at address 170h–177h (17Xh).

Within the primary and secondary cascades, the master and slave drives are each selected by the decoding of the CPU-issued I/O access ports. In the case of the primary cascade, when the issued I/O ports fall in the range of 1F0h–1F7h, a chip-select signal CS17X FX#, which may be an active low signal in the case of the ISA IDE/EIDE interface, is relayed to the IDE drives in the cascade via the pin 37 of the drive connector of the EIDE interface. On the other hand, when the CPU I/O port access falls in the range of 3F6h–3F7h, another active-low chip-select signal CS3F6# is relayed to the IDE drives via pin 38 of the EIDE connector. Similarly, when the secondary cascade is concerned, the chip-select signals CS17X# and CS376# are generated by decoding the effective CPU-issued I/O addresses in the ranges 170h–177h and 376h–377h respectively.

The chip-select signals CS1FX# and CS3F6#, as well as CS17X# and CS376# are thus utilized by the disk controller 20 to distinguish between the host access to the master and slave drives in the primary and secondary cascades. In addition to this, the master and slave drives in the primary and secondary cascades themselves are further distinguished by the sixth bit of the data byte at the I/O ports 1F6h and 176h respectively. A zero bit (logical low) appearing at the sixth bit of I/O address 1F6h or 176h signifies the designation of a drive as the master drive in the cascade, and an one bit (logical high) signifies the designation as the slave drive. The jumpers 55, 56, 65 and 66 on the IDE drives 50, 51, 60 and 61 respectively serve to configure each of the drives to properly receive and interpret the SD6 bit of the 1F6h and 176h port for a desired master/slave designation.

Thus, the configuration of the master and slave drives in the primary and secondary cascades of a conventional EIDE interface can be adjusted only by physically changing a drive jumper setting and the cabling. Such adjustments require that the hardware configuration be altered by gaining physical access to the internal area of the computer system unit. This is a job that requires certain specialized knowledge of to the computer system which the majority of computer users do not have.

SUMMARY OF THE INVENTION

It is therefore an object of the present invention to provide an apparatus for selecting the primary/secondary and the master/slave configuration of an enhanced IDE interface.

It is another object of the present invention to provide an apparatus for selecting the primary/secondary and the master/slave configuration of an enhanced IDE interface that allows for the setting of the arbitrary configuration of the multiply installed IDE drive devices in a desired drive letter arrangement.

It is still another object of the present invention to provide an apparatus for selecting the primary/secondary and the master/slave configuration of an enhanced IDE interface that allows for the setting of any of the multiply installed IDE drive devices as the booting drive.

The present invention achieves the above-identified objects by providing an apparatus for selecting the primary/secondary and the master/slave configuration of an enhanced IDE interface. The apparatus has a first and a second connector each for connecting to a cascade of a first and a second IDE drive devices. The apparatus comprises a primary/secondary configuration logic and a master/slave configuration logic. The primary/secondary configuration logic is utilized for selectively configuring the first and second connectors of the enhanced IDE interface as the primary and secondary connectors of the IDE interface respectively, or as the secondary and primary connectors of the enhanced IDE interface respectively. The master/slave configuration logic is utilized for selectively configuring the first and second IDE drive devices in each of the cascades as the master and slave drives respectively, or as the slave and master drives respectively.

BRIEF DESCRIPTION OF THE DRAWING

Other objects, features, and advantages of the present invention will become apparent by way of the following detailed description of the preferred but non-limiting embodiments. The description is made with reference to the accompanying drawings in which.

DETAILED DESCRIPTION OF THE PREFERRED EMBODIMENT

Figure 1:
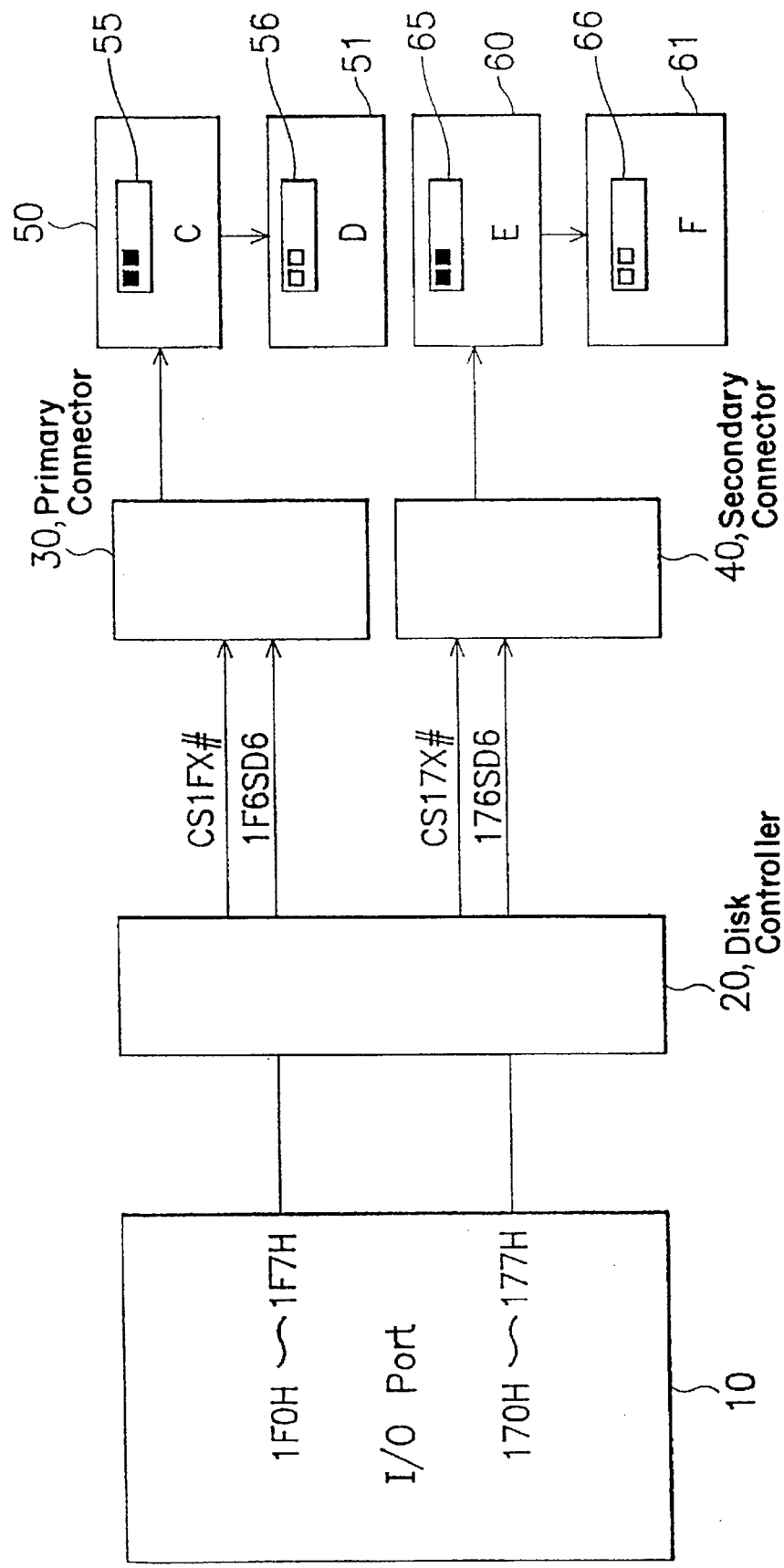
FIG. 1 (Prior Art) is a block diagram showing the configuration of a conventional connection of four IDE hard disk drives in a computer system.
Figure 2:
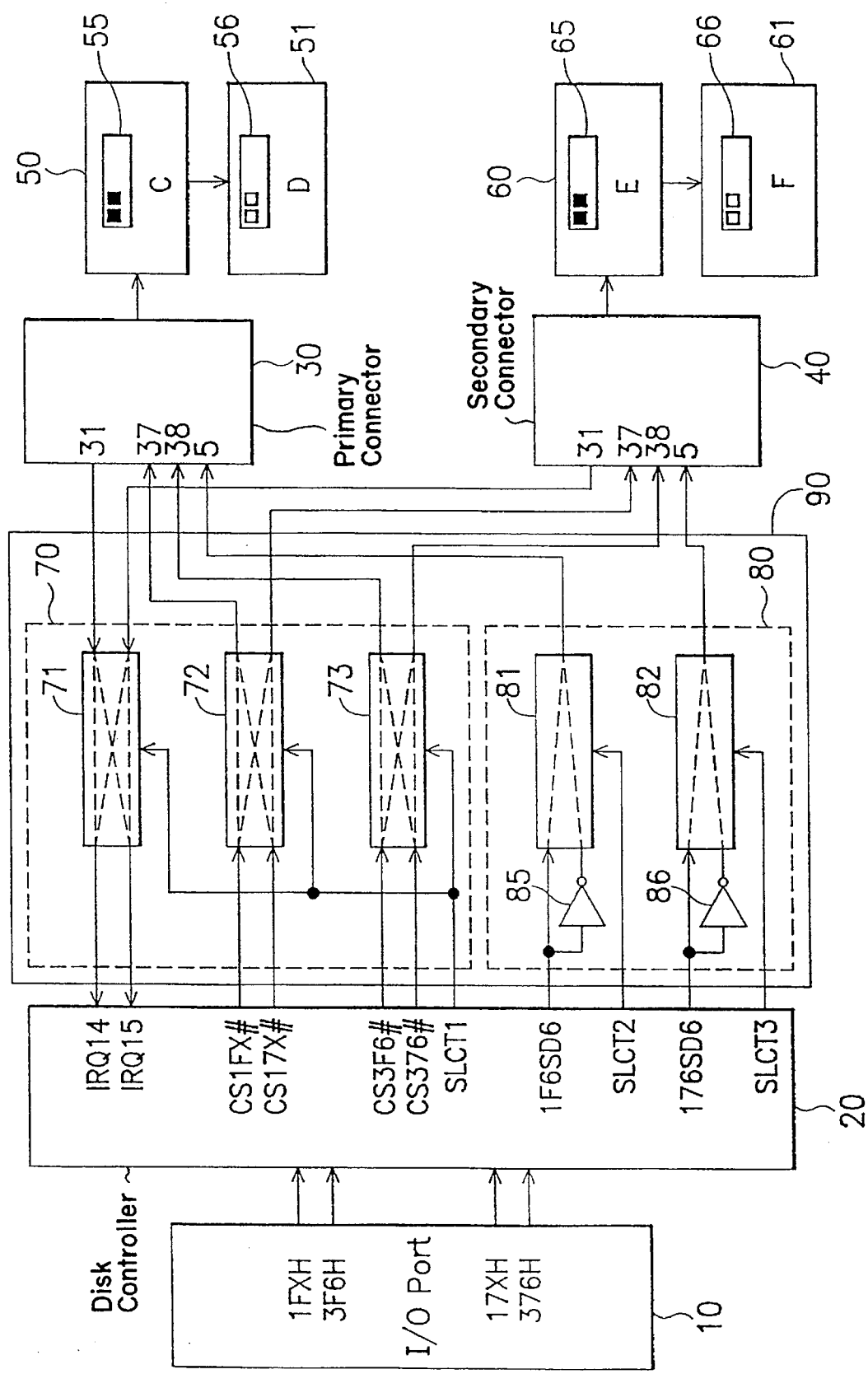
FIG. 2 is a block diagram showing the electronic circuitry of the EIDE interface in accordance with a preferred embodiment of the present invention.

Referring to FIG. 2, the apparatus for selecting the primary/secondary and the master/slave configuration of an EIDE interface of a computer system, in accordance with a preferred embodiment of the present invention, comprises a configuration logic 90 that is inserted between the disk controller 20 and the primary and secondary connectors 30 and 40. The configuration logic 90 comprises two functional portions, the primary/secondary configuration block 70 and the master/slave drive configurator block 80 respectively.

The primary/secondary configuration block 70 is responsible for the selective configuration of the primary and secondary connectors for the EIDE interface. Signals in relation to the swap of the master and slave drives in the primary and secondary connectors are also handled. The master/slave drive configurator block 80, on the other hand, handles the configuration of each of the drives as the designated master or slave drive, achieving the same function of physically adjusting the master/slave setting jumper blocks on drives. 50, 51, 60 and 61.

As is seen in the drawing, the disk controller 20, which may be implemented in a disk controller IC chip in the typical EIDE interface adapter for microprocessor-based home or office computers, can be hooked up to the computer system in the I/O port 10 via a system expansion bus not shown in the drawing.

All the interfacing commands issued to the drives by the host computer, as well as the data transceiving between the drives and the host, are done via these designated I/O ports. In the case of the ISA version of the EIDE interface, the data transfer between the host and the drives are conducted over the ISA bus in single or double-bytes. For example, in the original IBM PC-AT computer, the I/O ports 1F0h–1F7h (hexadecimal) were designated for the "fixed disk drive". In ISA computers systems generally known as IBM-compatible computer, drives C and D of the primary cascade have a set of designated I/O ports at address 1F0h–1F7h (generally denoted as 1FXh), while drives E and F of the secondary cascade have a set of I/O ports designated at address 170h–177h (17Xh).

Within the primary and secondary cascades, the master and slave drives are each selected by the decoding of the CPU-issued I/O access ports. In the case of the primary cascade, when the issued I/O ports fall in the range of 1F0h–1F7h, a chip-select signal CS1FX#, which may be an active low signal in the case of the ISA IDE/EIDE interface, is relayed to the IDE drives in the cascade via the pin 37 of the drive connector of the EIDE interface. On the other hand, when the CPU I/O port access falls in the range of 3F6h–3F7h, another active-low chip-select signal CS3F6# is relayed to the IDE drives via pin 38 of the EIDE connector. Similarly, when the secondary cascade is concerned, the chip-select signals CS17X# and CS376# are generated by decoding the effective CPU-issued I/O addresses in the ranges 170h–177h and 376h–377h respectively.

The chip-select signals CS1FX# and CS3F6#, as well as CS17X# and CS376# are thus utilized by the disk controller 20 to distinguish between the host access to the master and slave drives in the primary and secondary cascades. In addition to this, the master and slave drives in the primary and secondary cascades themselves are further distinguished by the sixth bit of the data byte at the I/O ports 1F6h and 176h respectively. A zero bit (logical low) appearing at the sixth bit of I/O address 1F6h or 176h signifies the designation of a drive as the master drive in the cascade, and an one bit (logical high) signifies the designation as the slave drive. The jumpers 55, 56, 65 and 66 on the IDE drives 50, 51, 60 and 61 respectively serve to configure each of the drives to properly receive and interpret the SD6 bit of the 1F6h and 176h port for a desired master/slave designation.

In addition, the primary/secondary configuration block 70 includes an IRQ line selector 71, a primary/secondary selector 72, and a master/slave selector 73, as is shown in the drawing. The IRQ line selector 71 serves to direct the interrupt request signal issued by either of the primary and secondary cascade of drives to the IRQ inputs of the disk controller 20. The disk controller 20 relays the IRQ line to the interrupt controller of the host computer via the system expansion bus not shown in the drawing. In the case of ISA computers, the master and slave drives in the primary cascade are normally required to direct their service request interrupt signal to the designated IRQ line, that is, IRQ14 of the core logic of the ISA computer. Drives in the second cascade are required to direct to, for example, IRQ15. In a typical EIDE connector, either primary or secondary, the IRQ signal as issued by the master or slave drive is sent to the disk controller 20 via pin 31. In FIG. 2, it is shown that pin 31 of both the connectors 30 and 40 is each connected to the input of the IRQ line selector 71. A selection input SLCT1 issued by the disk controller 20 serves to determine the selection of the assignment of the two IRQ lines coming from pin 31 of the two connectors 30 and 40.

The primary/secondary selector 72 serves to direct the primary and secondary chip-select signals CS1FX# and CS17X# to the two connectors 30 and 40 respectively. These chip select signals are generated by the disk controller 20 through decoding the CPU-issued I/O port addresses. As is shown in the drawing, these chip-select signals are each connected to the respective pin 37 of connectors 30 and 40. The configuration selection signal SLCT1 described above is again utilized to determine the selection of the assignment of the two chip select signals CS1FX# and CS17X# to pin 37 of the two connectors 30 and 40.

The master/slave selector 73 is utilized to direct the slave drive chip select signals CS3F6# and CS376# to the two connectors 30 and 40 respectively. These chip select signals are also generated by the disk controller 20 through decoding the CPU-issued I/O port addresses. The drawing of FIG. 2 shows that these two slave drive chip select signals are each connected to the respective pin 38 of connectors 30 and 40. Again, the configuration selection signal SLCT1 is utilized to determine the selection of the assignment of the two chip select signals CS3F6# and CS376# to pin 38 of the two connectors 30 and 40.

The same configuration selection signal SLCT1 controls the selection of the three selectors 70, 71 and 72 simultaneously. The logical configuration of the primary/secondary configuration block 70 achieves a selection condition such that either of the connectors 30 and 40 will have a selected set of IRQ line, primary/secondary chip select signal, and the master/slave chip select signal. Specifically, the set of primary-related signals, that is, IRQ14, CS1FX# and CS3F6# will be connected to pins 31, 37 and 38 of either connector 30 or 40, while the set of secondary-related signals, IRQ15, CS17X# and CS376# will then be connected to pins 31, 37 and 38 of either connectors 40 and 30 respectively. When the primary set of signals are connected to the respective pins of connector 30, and the secondary set of signals to connector 40, connector 30 will then be the primary and connector 40 will be the secondary connector for the EIDE interface. The reverse is true when the configuration selection signal SLCT1 is inverted.

The master/slave drive configurator block 80, on the other hand, includes a master/slave configurator 81 and another master/slave configurator 82, as is seen in the drawing. The master/slave configurator 81 serves to selectively invert the logical status of the SD6 data bit that is employed by the drives in the cascade of connector 30 to identify themselves as either the master or the slave drive in the cascade. The master/slave configurator 82, in a similar manner, serves to selectively invert the logical status of the SD6 data bit in the cascade of connector 40.

The master/slave configurators 81 and 82 may each be a two-to-one multiplexer that selects between the 1F6SD6 and 176SD6 bits and their inverted versions. The inverters 85 and 86 serve to provide the inversion for the 1F6SD6 and 176SD6 signals. The signals 1F6SD6 and 176SD6 are decoded out of the 1F6h and 176h ports that are employed for the identification of the master and slave drives within the same drive cascade. The two master/slave configurators 81 and 82 may each have their own configuration selection signal SLCT2 and SLCT3 respectively. This allows for the independent swapping of the master/slave assignment in each of the two cascades on the connectors 30 and 40. In the case of the conventional IDE drives widely used in ISA computers, this identifying SD6 bit is the D6 bit in the drive data/control cable, generally appointed at pin 5 of the connectors 30 and 40.

Thus, by selectively setting the logical status of the configuration selection signal SLCT1, the connectors 30 and 40 can be assigned as the primary and secondary connectors respectively, or vice versa. On the other hand, by selectively setting the logical status of the configuration selection signals SLCT2 and SLCT3 respectively, all the drives in the two cascades connected over the connectors 30 and 40 may each be configured either as the master, or as the slave drive. This greatly increases the flexibility of the drive letter assignment in a computer system. In some occasions, for example, each of the installed IDE hard disk drives may be configured with a different operating system.

For example, in a computer system equipped with an EIDE interface employing an embodiment of the present invention, one drive in the connector 30 may have a bootable DOS operating system residing therein, and the other drive in the cascade of connector 30 may have a bootable OS/2 operating system, while one drive in the connector 40 may have a bootable Unix operating system, and the other drive in the cascade of connector 40 may have a bootable Windows NT. With this software configuration, the computer system may easily be adjusted to boot from any of the four operating systems, without the need to physically adjust the drive master/slave configuration jumpers and the drive data/control cabling.

The configuration selection signals SLCT1, SLCT2 and SLCT3 may be generated electronically by setting configuration registers in, for example, the BIOS setup procedure, or by mechanically setting switches provided to determine the logical status thereof.

As persons skilled in this art may well appreciate, the above description of the preferred embodiment of the present invention is employed for the purposes of description, not to restrict the scope of the present invention. Modifications to the outlined embodiment of the present invention may be apparent and should be considered to be within the scope of the present invention that is recited in the claims that follow.

I claim:

1. An apparatus for selecting a primary connector and a secondary connector from among a first connector and a second connector, and for selecting a master drive and a slave drive from among a first IDE drive device and a second IDE drive device included within each of two cascades, one of said two cascades being connected to said first connector and another of said two cascades being connected to said second connector, said apparatus comprising:

primary/secondary configuration logic means electrically connected to said first connector and said second connector for selectively configuring said first connector and said second connector as one of said primary connector and said secondary connector respectively and said secondary connector and said primary connector respectively;

master/slave configuration logic means electrically connected to said first connector and said second connector for selectively configuring said first IDE drive device and said second IDE drive device in each of said two cascades as one of said master drive and said slave drive respectively and said slave drive and said master drive respectively; and configuration selection signaling means connected to said primary/secondary configuration logic means and said master/slave configuration logic means for instructing said primary/secondary logic means to selectively configure said first connector and said second connector as one of said primary connector and said secondary connector respectively and said secondary connector and said primary connector respectively, and for instructing said master/slave configuration logic means to selectively configure said first IDE drive device and said second IDE drive device in each of said plurality of cascades as one of said master drive and said slave drive respectively and said slave drive and said master drive respectively, said configuration selection signaling means being responsive to a setting of one of at least one mechanical switch and at least one configuration register.

2. An apparatus according to claim 1, wherein said IDE interface is an enhanced IDE interface.

3. The apparatus according to claim 1, wherein said master/slave configuring logic means comprises:

a first master/slave configurator to selectively invert a master/slave configuration bit for said first connector of said IDE interface; and a second master/slave configurator to selectively invert a master/slave configuration bit for said second connector of said IDE interface.

4. The apparatus according to claim 3, further comprising:

a second input to receive a second selection input signal having a first logical state and a second logical state, said first logical state of said second selection input signal controlling said first master/slave configurator to selectively configure said first IDE drive device in said one of said two cascades connected to said first connector as said master drive, and said second IDE drive device in said one of said two cascades connected to said first connector as said slave drive, said second logical state of said second selection input signal controlling said first master/slave configurator to selectively configure said first IDE drive device in said first connector as said slave drive, and said second IDE drive device in said one of said two cascades connected to said first connector as said master drive.

5. The apparatus according to claim 3, further comprising:

a third input for receiving a third selection input signal having a first logical state and a second logical state, said first logical state of said third selection input signal controlling said second master/slave configurator to selectively configure said first IDE drive device in said other cascade of said two cascades connected to said second connector as said master drive, and said second IDE drive device in said other cascade of said two cascades connected to said second connector as said slave drive, said second logical state of said third selection input signal controlling said second master/slave configurator to selectively configure said first IDE drive device in said other cascade of said two cascades connected to said second connector as said slave drive, and said second IDE drive device in said other cascade of said two cascades connected to said second connector as said master drive.

6. An apparatus for selecting a primary connector and a secondary connector from among a first connector and a second connector, and for selecting a master drive and a slave drive from among a first IDE drive device and a second IDE drive device included within each of two cascades, one of said two cascades being connected to said first connector and another of said two cascades being connected to said second connector, said apparatus comprising:

primary/secondary configuration logic means electrically connected to said first connector and said second connector for selectively configuring said first connector and said second connector as one of said primary connector and said secondary connector respectively and said secondary connector and said primary connector respectively; and master/slave configuration logic means electrically connected to said first connector and said second connector for selectively configuring said first IDE drive device and said second IDE drive device in each of said two cascades as one of said master drive and said slave drive respectively and said slave drive and said master drive respectively;

wherein said primary/secondary configuration logic means comprises:

an IRQ line selector for selecting interrupt request signals issued by each of said first IDE drive devices and each of said second IDE drive devices, a primary/secondary selector for selecting a primary chip select signal and a secondary chip select signal for connection to one of said first connector and said second connector respectively and said second connector and said first connector respectively, and a master/slave selector for selecting a master chip select signal and a slave chip select signal for connection to one of said first connector and said second connector respectively and said second connector and said first connector respectively.

7. The apparatus according to claim 6, wherein said master/slave configuring logic means comprises:

a first master/slave configurator to selectively invert a master/slave configuration bit for said first connector of said IDE interface; and a second master/slave configurator to selectively invert a master/slave configuration bit for said second connector of said IDE interface.

8. The apparatus according to claim 7, wherein:

said apparatus has a first input to receive a first selection input signal having a first logical state that controls said primary/secondary configuration logic means for selectively configuring said first connector and said second connector as said primary connector and said secondary connector respectively, and said first input to receive said first selection input signal having a second logical state that controls said primary/secondary configuration logic means for selectively configuring said first connector and said second connector as said secondary connector and said primary connector respectively.

9. The apparatus according to claim 8, wherein said first selection input signal received at said first input controls a simultaneous selection of said IRQ line selector, said primary/secondary selector, and said master/slave selector.

10. The apparatus according to claim 9, further comprising:

a second input to receive a second selection input signal having a first logical state and a second logical state, said first logical state of said second selection input signal controlling said first master/slave configurator to selectively configure said first IDE drive device in said one of said two cascades connected to said first connector as said master drive, and said second IDE drive device in said one of said two cascades connected to said first connector as said slave drive, said second logical state of said second selection input signal controlling said first master/slave configurator to selectively configure said first IDE drive device in said one of said two cascades connected to said first connector as said slave drive, and said second IDE drive device in said one of said two cascades connected to said first connector as said master drive.

11. The apparatus according to claim 10, further comprising:

a third input for receiving a third selection input signal having a first logical state and a second logical state, said first logical state of said third selection input signal controlling said second master/slave configurator to selectively configure said first IDE drive device in said other cascade of said two cascades connected to said second connector as said master drive, and said second IDE drive device in said other cascade of said two cascades connected to second connector as said slave drive, said second logical state of said third selection input signal controlling said second master/slave configurator to selectively configure said first IDE drive device in said other cascade of said two cascades connected to said second connector as said slave drive, and said second IDE drive device in said other cascade of said two cascades connected to said second connector as said master drive.

12. An apparatus according to claim 11, wherein said IDE interface is an enhanced IDE interface.

13. The apparatus according to claim 6, wherein:

said apparatus has a first input to receive a first selection input signal having a first logical state that controls said primary/secondary configuration logic means for selectively configuring said first connector and said second connector as said primary connector and said secondary connector respectively, and said first input to receive said first selection input signal having a second logical state that controls said primary/secondary configuration logic means for selectively configuring said first connector and said second connector as said secondary connector and said primary connector respectively.

* * * * *